Feb. 12, 1952

P. E. PRUTZMAN 2,585,273

REARVIEW MIRROR

Filed Jan. 26, 1950

*INVENTOR.*
PAUL E. PRUTZMAN

*ATTORNEY*

Feb. 12, 1952 P. E. PRUTZMAN 2,585,273
REARVIEW MIRROR

Filed Jan. 26, 1950 2 SHEETS—SHEET 2

*INVENTOR.*
PAUL E. PRUTZMAN
BY
*ATTORNEY*

Patented Feb. 12, 1952

2,585,273

UNITED STATES PATENT OFFICE 2,585,273

REARVIEW MIRROR

Paul E. Prutzman, South Gate, Calif.

Application January 26, 1950, Serial No. 140,669

6 Claims. (Cl. 219—19)

This invention relates to a mirror and retaining case adapted to be mounted at the side of an automotive vehicle to enable the driver to view a part of the road to the rear of the vehicle.

A purpose of the invention is to provide a device of the described type particularly adapted to use on automotive trucks.

A purpose of the invention is to provide a device of the described type which is capable of being readily swung to and firmly retained in the angular position in which it affords the maximum degree of road visibility.

A purpose of the invention is to provide a device of the described type in which the mirror proper is rigidly backed to protect it against the excessive vibration to which heavy duty trucks are subjected, and in which the mirror is readily removed for replacement.

A purpose of the invention is to provide a device of the described type which offers the minimum wind resistance consistent with its area.

A purpose of the invention is to provide a device of the described type which requires the minimum of labor in assembling and which may be mass-produced at a low cost.

A purpose of the invention is to provide a device of the described type which may, if preferred, be formed from sheet metal but which is particularly adapted to be producible by die casting metals of low melting point and relatively high strength.

A purpose of the invention is to provide a device of the described type in which the mirror may be heated, when necessary, and thus maintained at a temperature at which obscuration by dew, fog or snow are avoided.

The invention may best be understood with reference to the attached drawings and the following description thereof, in which Fig. 1 is an elevation of the reflecting or mirror side of the structure;

Figures 1, 2, 3:
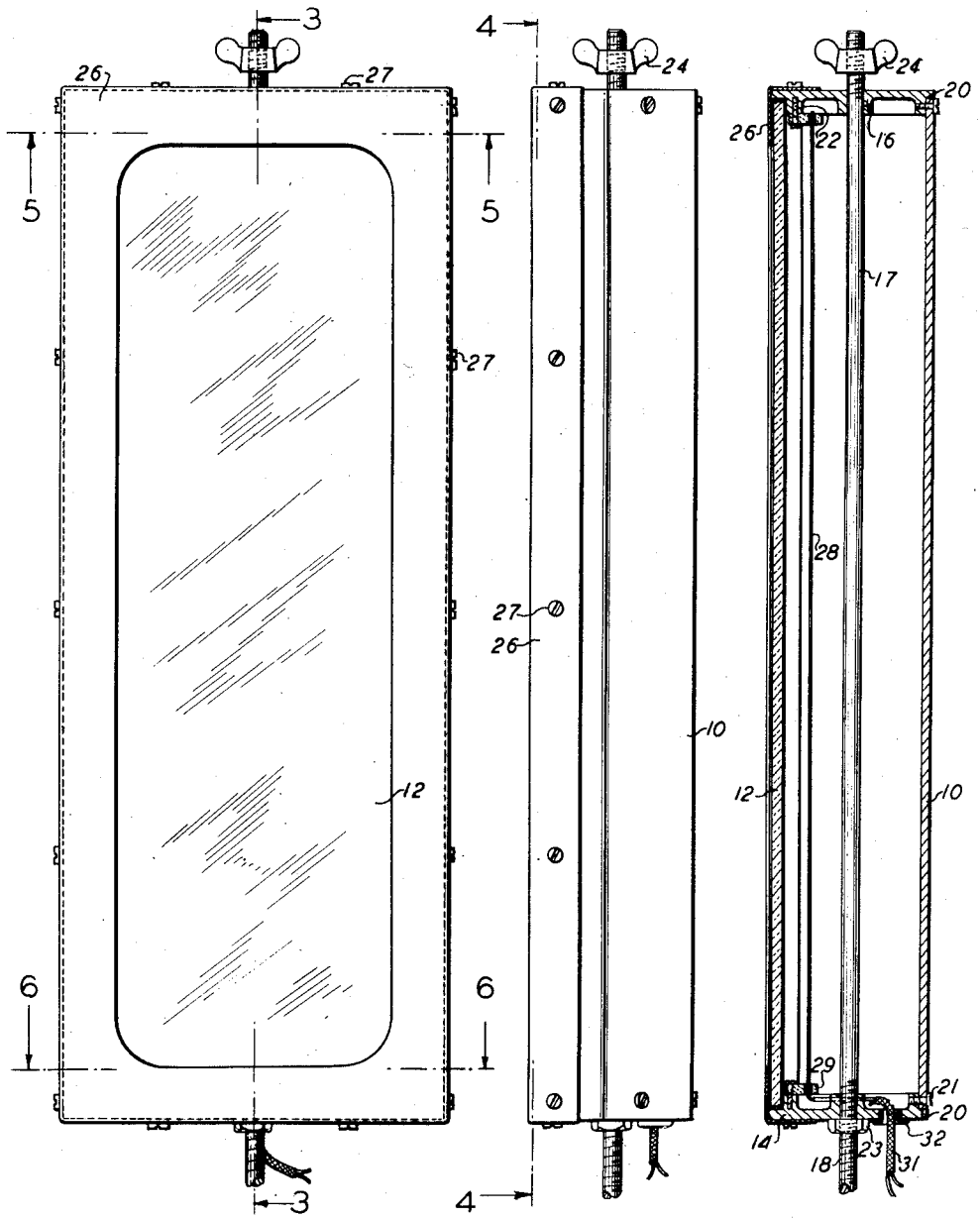
Fig. 2 is a side elevation of the assembled device.
Fig. 3 is a longitudinal center section through the structure, as on the line 3—3 of Fig. 1.
Figure 4:
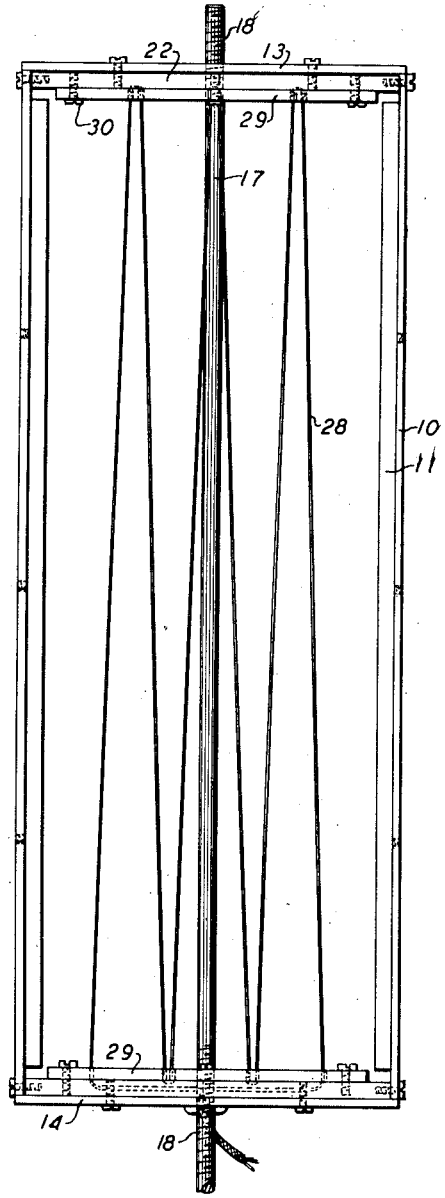
Fig. 4 is an interior elevation of the device, with the mirror and its retaining ring removed, as on the line 4—4 of Fig. 2, showing an illustrative heating element in elevation.

Referring to the drawings, 10 is a trough-like casing member of U-section or a modified U-section, provided internally with longitudinal ribs 11—11 to support a mirror 12. The casing is provided with an upper end plate 13 and a lower end plate 14, the device being intended for mounting with its longer axis in a vertical position.

Each of these plates is provided with a central boss 15 having a central, unthreaded opening 16 to receive a supporting rod 17, this rod being threaded at its ends as at 18—18 for attachment to suitable brackets, not shown, by which the assembly is supported from a preferred portion of the vehicle cab, usually the door.

The end plates are also provided with peripheral, internally projecting ribs 19—19, forming shoulders 20—20 against which the ends of the casing rest, the end plates being fastened to the casing by a plurality of machine screws 21—21. It is desirable also to provide each end plate with a rib 22, parallel to its straight edge, to support the ends of the mirror and also to afford means for the attachment of a heating element later described.

A nut 23 on rod 17 at the lower end of the device may be used to make minor adjustments of the height at which the structure is set, while a nut 24, preferably a wing nut, is used to clamp the device in the preferred angular position, the shell being freely rotatable about the supporting rod when this nut is loosened.

The mirror 12, which should be of plate glass with the usual reflecting coating, rests on soft gaskets 25—25 placed on ribs 11 and 22, and is fixed in position by a retaining ring 26 which may be a die casting or a stamping of sheet metal. This ring slips over the open face of the shell and is retained in position by four or more machine screws 27 passing through its flange into the wall of the shell. As ribs 11 and 22 are not continuous it is desirable to waterproof the joint between the ring and the face of the mirror to exclude storm water from the interior of the shell. This waterproofing element may be a continuous soft gasket or a coating of red lead and linseed oil placed between the glass and the inner face of the ring.

The heating element illustrated in the drawings, and which will be understood to be suggestive only, comprises a resistance wire 28 passed back and forth between strips 29—29 of refractory insulating board, which may be secured to end plate ribs 22—22 by machine screws 30.

Lead wires 31 to any switch not shown pass out through an insulating bushing 32 fixed in lower end plate 14.

The length and diameter of resistance wire are not specified, as the resistance provided will be varied to suit the voltage of the truck battery and also with the severity of the climate in which the vehicle is mainly used. It is desirable, however, to divide the total length of resistance wire into two unequal portions and to provide a switch which will permit either portion or both to be used as temperature variations may require.

It should be understood that the use of the heating element is optional, as in mild and dry climates it may not be necessary to heat the mirror. The structure is so arranged, however, that a heating element may be inserted at any time, without removing the device from the supporting brackets, by merely dismounting the retaining ring and mirror, which leaves the interior of the shell freely accessible.

The details above described are such as render the device particularly adapted to production by die casting, though it may if preferred be formed by pressing or stamping the parts from sheet metal and welding or brazing the end plates to the trough-like casing. The use of sheet metal avoids or reduces the initial cost of dies and is suitable for the fabrication of a small number of units, but yields a somewhat less rigid structure at a higher cost for labor. For quantity production, die casting is more economical and achieves the maximum of stiffness and durability.

It will be noted that aside from such stock materials as mirror, supporting rod, nuts and screws, the device consists of but four parts—the casing member 10, two substantially identical heads 13 and 14 and the retaining ring 26—and that each of these parts is so formed that it may be cast in a simple and relatively inexpensive die having suitable draft. No machine work is required other than the drilling and tapping of small holes, and in consequence the structure is adapted to rapid production at small labor cost.

The metal used for the casing and heads is a matter of choice. Brass is strong and highly resistant to corrosion, but by reason of its high melting point is destructive of casting dies. Aluminum and some of its alloys flow well at relatively low temperatures and may be used, though as a rule they are somewhat deficient in strength. My preference is for the use of zinc for the cast elements where this method of fabrication is used.

The use of a trough-shaped, hollow casing as a support for the mirror proper has important advantages over the mountings heretofore used.

First, a closed chamber is provided in which a heating element may be spaced evenly from the glass and at such distance as to avoid cracking by uneven expansion of the mirror.

Second, an extremely rigid support for the mirror is inherent in the trough-like form of the casing, and cracking of the mirror due to vibration or to warping of the support, a common occurrence in the use of flat metallic backing elements, is avoided.

Third, the curved or semi-octagonal face of the trough, which as the assembly is mounted is the forwardly directed face, has far less wind resistance than a flat face of the same area. These mirrors are of large size, commonly 6" x 16", and at high speed the wind pressure on a flat surface of this area, plus constant and in many cases extreme vibration, throws destructive stresses on the supporting brackets. These stresses are in large measure relieved by the curvature of the forwardly moving face of the trough-shaped case.

Fourth, the hollow shell provides space for a supporting rod around which the weight of the assembly is more or less evenly distributed and around which the assembly is rotatable for adjustment of the horizontal angle. This is a highly desirable arrangement in that the angle of the face of the mirror with the ground is fixed in the proportioning of the brackets and cannot change under vibration, while the horizontal angle may readily be adjusted to suit the preference of the operator and has no tendency to change after locking in position. As is well known, mirrors supported by universal joints located far outside the center of gravity have a strong tendency shift from the position in which they are set and thus become useless at inconvenient moments.

Fifth, the intrinsic rigidity of the assembly makes it possible, by the provision of an equally stiff and rigid bracket, to avoid the secondary vibrations of the mirror face which, in other methods of mounting, are likely to blur and obscure the image seen in the mirror.

Figure 5:
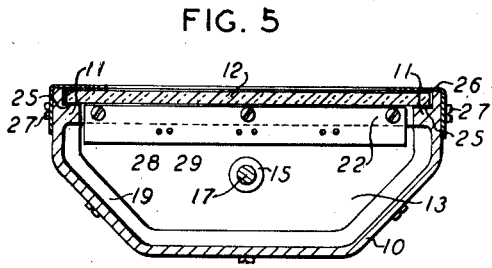
Fig. 5 is a section through one end of the device, showing one of the end plates in interior elevation, as on the line 5—5 of Fig. 1.
Figure 6:
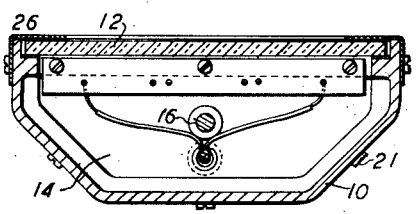
Fig. 6 is a similar section and elevation at the opposite end of the structure, as on the line 6—6 of Fig. 1.
Figure 7:
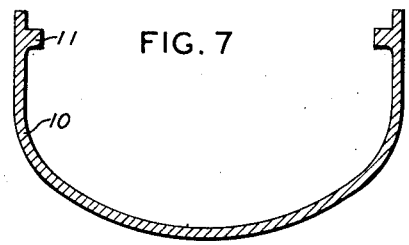
Fig. 7 is a section through a modified form of the casing member 10.

The casing illustrated in Figs. 5 and 6 has an angular cross-section, being half of an octagon, while that shown in Fig. 7 is in the form of a flattened U. In claiming a trough-shaped member I intend to claim both of these equivalent forms, as well as curvatures other than those shown in Fig. 7. The curved form is better adapted to production by die casting while the angular form is easier to produce in stamping sheet metal. In either case, it is preferable that the depth of the trough should be not less than one-third of its width and may with advantage be even greater.

While I do not limit myself to any specific form of heating element, I have found that under most conditions about eight feet of Nichrome wire having a resistance of one ohm per foot affords sufficient heat for a 6" x 16" mirror when in circuit with a 12-volt battery or generator. This wire may be strung in either direction within the case though there will be less tendency to sag if arranged vertically. As truck mirrors are always used in pairs, one at each side of the vehicle, a convenient manner of connecting the two heating elements is through a switch which permits them to be coupled in parallel for maximum heating effect and in series for lower temperatures.

I claim as my invention:

1. A rear view mirror assembly consisting essentially of an elongated, trough-shaped casing member having end plates, said casing member being generally curvilinear in cross-section; internal, mirror-supporting projections from said casing and end plates; a mirror resting on said projections and spaced thereby from the bottom of said trough; a retaining ring of L-section covering the rim of said mirror and overlapping the adjacent edges of said trough, said ring being attached to said trough by screws passed through the mating portions of said ring and trough in planes parallel to the plane of said mirror.

2. An assembly as described in claim 1, further including threaded elements projected from said end plates to provide a swivelling support for said assembly, and lock nuts on said threaded elements for locking said assembly to a supporting bracket in a preferred angular position.

3. An assembly as described in claim 1, further including internally disposed means for heating said mirror.

4. An assembly as described in claim 3, in which said heating means is an electrical heating element comprising resistance wires arranged in a plane substantially parallel to the inner face of said mirror and within said casing member, said resistance wires being divided into two portions of unequal resistance, said portions being separately connected to a source of electrical current for independent actuation.

5. An assembly as described in claim 1, in which said trough-shaped member has a section in the form of half of an octagonal figure.

6. A mounting for a rear view mirror: a rigid metallic trough having internal projections parallel to its edges against which said mirror may rest, said projections being arranged to space said mirror from the bottom of said trough; heads closing the ends of said trough; means for non-leakably clamping said mirror in position on said projections, and threaded elements provided with lock nuts and projected from said heads in a longitudinal axis of said mounting for the attachment thereof to a supporting bracket in a substantially vertical position.

PAUL E. PRUTZMAN.

REFERENCES CITED

The following references are of record in the file of this patent:

UNITED STATES PATENTS

| Number | Name | Date |
|---|---|---|
| 1,387,887 | Gage | Aug. 16, 1921 |
| 1,828,804 | Horton | Oct. 27, 1931 |
| 1,933,173 | Hunt | Oct. 31, 1933 |
| 2,015,816 | Pyzel | Oct. 1, 1935 |
| 2,262,586 | James | Nov. 11, 1941 |